Patented July 7, 1942

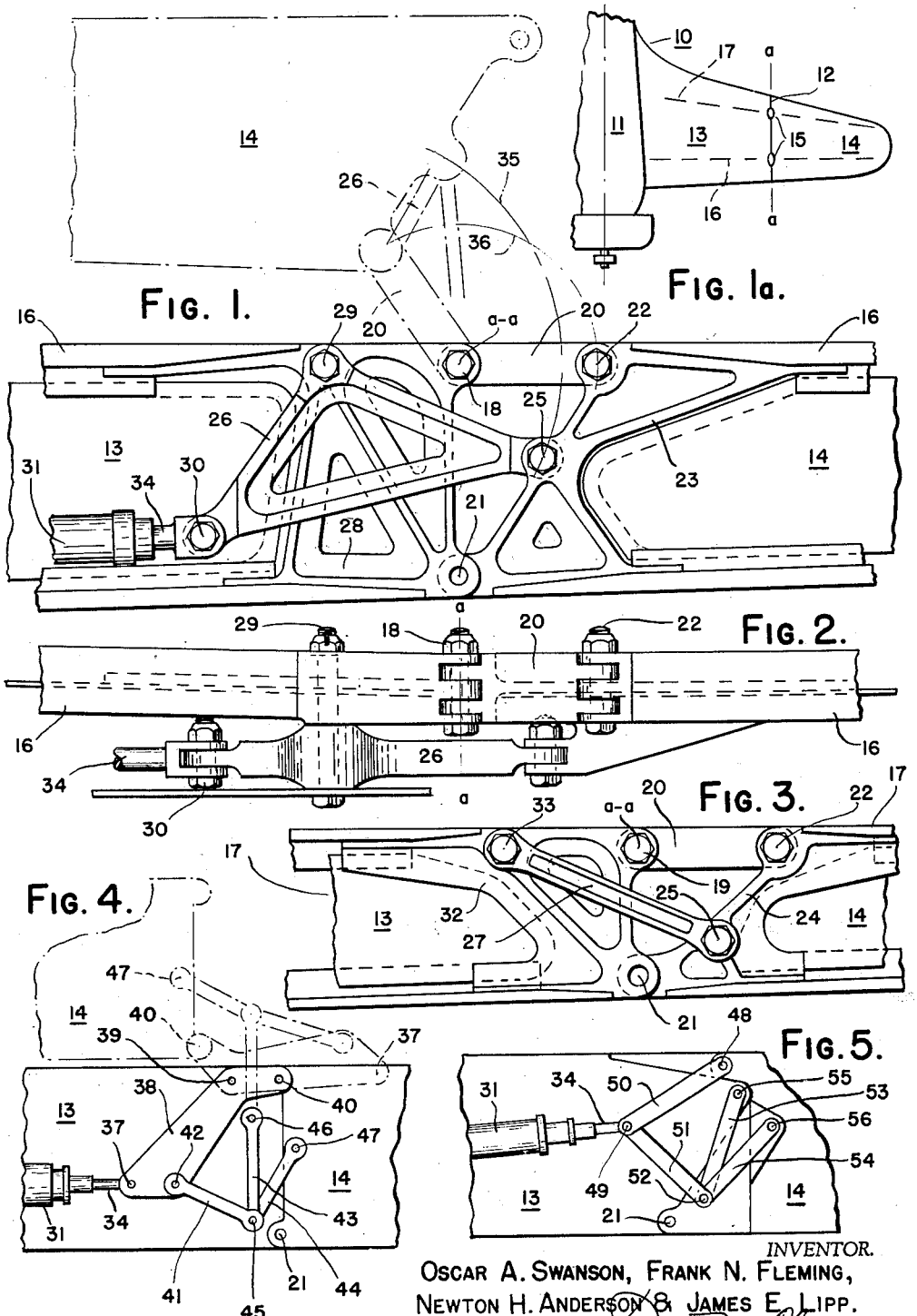

2,289,224

UNITED STATES PATENT OFFICE 2,289,224

FOLDING WING AIRCRAFT

Oscar A. Swanson, Pacific Palisades, James E. Lipp, and Newton H. Anderson, Santa Monica, and Frank N. Fleming, Pacific Palisades, Calif., assignors to Douglas Aircraft Company, Inc., a corporation of Delaware Application February 19, 1940, Serial No. 319,616

10 Claims. (Cl. 244—49)

The present invention relates to aircraft having folding wings and more particularly to those airplanes in which the outer wing portions are extended or retracted by an operator on or within the aircraft.

This invention relates more particularly to aircraft in which the outer wing portions are folded upwardly and inwardly about longitudinal axes into positions in which the outer wing panels overlie the center panels of the wing, and the wing tips are disposed in closely contiguous positions either above or adjacent to the central fuselage of the airplane. The present invention is more particularly applicable to aircraft of the monoplane type and is intended to utilize extending, retracting and locking mechanism of any suitable type, such as is disclosed in J. L. Atwood et al. Patent No. 2,166,564 which issued July 13, 1939, in conjunction with simplified hinging arrangements of an improved type.

It is an object of this invention to provide improved actuating and hinge mechanism between the inner and outer panels of folding wing aircraft, wherein the operating mechanism exerts its maximum turning effort on the hinge linkage when the opposite downward moment caused by the position and weight of the outer wing panel is greatest.

It is an object of the present invention to provide a simple and efficient actuating and hinge linkage whereby the folding wing portion may be rotated to a position overlying the wing portion to which it is hinged. A further object is the retraction of such wings through a full 180° rotation by means housed entirely within the wing in its extended position. It is a further object to provide hinged linkage for such wings in conjunction with suitable actuating mechanism whereby as the wing is rotated inwardly toward a vertical position suitable restraining forces can be exerted through the hinged linkage to prevent the folding wing from dropping upon the inner portion.

A further object of the present invention resides in the provision of a strong but light folding wing actuating system which is entirely self-contained within the profile of the wing during its normal attitude and which may be extended, retracted and locked or released by an operator on or within the aircraft.

Other objects and advantages will occur to those skilled in the art after a reading of the present specification and the attached drawing forming a part hereof, all of which are intended to come within the scope of the present invention as more clearly set forth by the appended claims.

Fig. 1a is a fragmentary plan view of an airplane to which the present invention has been applied;

Fig. 1 is a front elevation of the main spar hinge and folding mechanism;

Fig. 2 is a plan view of the same.

Fig. 3 is a front elevation of the rear spar hinge; and

Fig. 4 is a front elevation showing in outline a modified main spar hinge and folding mechanism; and Fig. 5 is a similar view of another modification.

Referring now to Figs. 1a to 3 inclusive, there is shown a preferred embodiment of our invention applied to a monoplane 10 having a central fuselage 11, from which internally braced wings 12 extend laterally on each side, the left wing only being shown in Fig. 1a. Each wing 12 is divided along the line $a$—$a$ into an inner wing portion or member 13 and an outer wing portion or member 14. The lines $a$—$a$ extend longitudinally in a fore and aft direction and are generally parallel to the chord line of the respective wing.

The inner wing portion 13 and the fuselage or body 11 serve as supports for the outer wing portion 14, through the hinge means 15, having their axis coincident with the line $a$—$a$, being provided between portions 13 and 14. The latter portions may be rotated fully 180° or more about the axis $a$—$a$ to a folded position wherein portion 14 is retracted and lies above and closely adjacent the supporting structure comprising the inner wing portion 13. The retracted position of the hinge portion of the member 14 is shown in the dash-dot lines of Fig. 1, in which the overall width of the airplane is reduced to approximately half its extended span, thereby resulting in a material saving in the floor space required for its storage. For purposes of illustration the wing 12 is shown comprised of a main wing front spar 16 and a secondary or rear spar 17, it being understood that our invention is equally applicable to wings devoid of spars or to wings having one or more spars. Where the axis $a$—$a$ passes through the upper chord portion of each spar 16 and 17, the spars are suitably apertured and provided with hinge pins 18 and 19 respectively.

In Figs. 1 and 2 the wing operating means is shown retracted in the full line position wherein the two wing portions 13 and 14 are connected at the upper chord of the front spar 16 by means of the link 20 and at the lower chord by the locking pin 21. The latter pins are preferably aligned in a fore and aft plane substantially beneath the upper hinge axis a—a, and are actuated by any suitable mechanism as, for example, that which is shown in the above Atwood et al. patent. The latter patent is also referred to for other details which do not form a part of the present invention and which for this reason are not more fully described herein. The link 20 is bifurcated to provide adequate shearing values of the pins and is also of sufficient cross-section to transmit the compressional stresses from the top chord of the outer section 14—16 to that of the inner section 13—16. These loads are imposed both during flight and that portion of the retraction movement when the entire weight of the outer wing is carried by the link 20.

The sections of the rear spar 17 are similarly connected by a link 20 of substantially the same length, both front and rear links being pivotally connected by the pins 22 to the outer hinge fittings 23 and 24, respectively. The latter fittings are also apertured for pins 25 forming the pivotal connections to the bellcrank or lever 26, its counterpart the link 27, and the outer hinge fittings 23 and 24, respectively. The inner wing portion is provided with a front spar fitting 28 apertured for hinge pin 18, lock pin 21, and pivot pin 29 for the bellcrank 26. The latter is triangular in shape, being apertured at each corner for the pins 25, 29 and 30, the last mentioned being the pivotal connection to the hydraulic actuating cylinder 31. The hinge fitting 32 is similarly attached to the inner rear spar section 13—17, being apertured for the hinge pin 19, the lock pin 21 and the pivot 33 for the inner end of the link 27. It will be noted that the axes of the pins 22, 25, 18—19 and 29—33 are aligned and parallel to each other, such that when the locking pin 21 is withdrawn the outer wing portion 14 is free to be rotated upwardly about the fixed pivots 18 and 19, and also 29—33.

In operation, after the locking pins 21 have been withdrawn, it will be noted that as the piston 34 is extended from the hydraulic cylinder 31 it imparts, at the pivot 30, counter-clockwise rotation to the bellcrank 26 about its fixed pivot 29. The pivot pin 25 engaging the outer hinge fitting 23 is caused to move along the arcuate path indicated by the dotted lines 35, imparting similar counter-clockwise rotation to the outer wing portion 14. At the same time the pivot axis of 22 is rotated through the dotted arcuate path 36 about the hinge axis a—a, the link 20, however, lagging somewhat behind the wing in its counter-clockwise rotation due to the eccentricity of the respective centers of rotation at a—a and at 29 respectively. The outer wing 14 may therefore be said to rotate through a non-arcuate path, being rocked forwardly in its rotation about the axis of pin 25 due to the action of the link 20 in gradually drawing the pivot 22 closer to the centers of rotation a—a and 29 than can be reached by the pivot 25, as evidenced by the crossing of the arcuate paths 35 and 36.

It will be noted that the pivots 25 and 30 also follow arcuate paths about the center of pin 29 and that the cylinder 31 is rotated slightly about its opposite pivotal terminal (not shown) in order to permit the pivot 30 at the piston terminal to move both outwardly and upwardly during the wing folding cycle. The shape of the bellcrank 26 and the location of the respective pivotal connections is such that the maximum turning effort is derived from the actuating mechanism 31—34 at those points in the wing folding cycle where they are required to be greatest, namely in lifting the wing from its horizontally extended position and in restraining the wing from falling abruptly as it passes beyond its vertical position. The link 20 in addition to its structural function of transmitting loads in flight from the outer to the inner wing portions, and its serving to carry the weight of the outer portion in its retracted position, also permits an offset or eccentric disposition of the horizontal axis whereby the wing portion 14 in Fig. 1 is retracted to a substantially horizontal position.

In the retracted attitude of the outer wing portion it will be noted that the adjacent surfaces of the wing portions are sufficiently spaced apart to prevent accidental damage to the surfaces and the arrangement does not require the cutting away of any considerable portion of the upper surface such as when a single fixed axis of rotation is used as provided at or near the wing surfaces. Obviously, the joints in the surface of the wing may be suitably sealed in the operative position by flexible means such as described in the said Atwood et al. patent. The actuating mechanism 31, in the preferred modification shown, is positioned at the front spar only and a simple link 27 serves the remaining function of the bellcrank at the rear spar. Obviously in larger airplanes it might be desirable to provide actuating means at two or more of the spar joints or suitable hinge fittings can be provided in a spar-less or monocoque wing. In fully retracted positions of the outer wing portions the latter may be suitably restrained from further undesired movement by a mechanical or hydraulic limit stop at the end of the telescopic movement between the piston 34 and the cylinder 31, by stops at reenforced points between the surfaces 13 and 14, or by other suitable known means.

With reference to the modification shown in Fig. 4 it will be noted that the actuating cylinder and piston device 31—34 is pivoted at 37 to a bellcrank fitting 38 which in turn is fixedly pivoted to the inner wing section at 39 about which it may be rotated upon extension of the piston 34. The bellcrank 38 is also pivotally connected to the outer portion 14 by the pivot 40 and to a terminal of a link 41 by means of a pivot 42. The other terminal of the link 41 is pivotally connected to the terminals of two additional links 43 and 44 by a pin connection 45 engaging all three links 41, 43 and 44. The remaining terminals 46 and 47 of the links 43 and 44 are pivotally attached to the inner and outer wing sections 13 and 14, respectively. As in the case of the modification described above, the pivotal connections in Fig. 4 are provided in similar wing hinge fittings and similar locking means may be provided at 21 in the lower chords of the front and rear spars.

In operation, in the mechanism shown in Fig. 4, after unlocking of the pin 21, the piston 34 is extended outwardly, counter-clockwise rotation is imparted to the bellcrank 38 about its fixed pivot 39 causing lifting and counter-clockwise rotation of the outer wing portion 14 by engagement of the pin 40 therewith. At the same time rotation of the bellcrank 38 causes outward movement of the link 41, counter-clockwise rotation of the link 43 and upward and outward movement of the link 44 which assists in lifting and rotating the outer wing portion 14 by rotating the same about the fixed pivot 39 while at the same time rocking the wing portion forwardly about the movable pivot 40.

As the assembly shown in Fig. 4 is continued through the retracting operation, the bellcrank 38 continues its rotation through an arcuate path, lagging somewhat behind the rotation of the outer wing portion 14. At the same time, the three links 41, 43 and 44 are caused to rotate about the fixed pivot 46, the links 41 and 44 becoming substantially aligned with each other at the fully retracted position as the link 43 assumes a substantially vertical position, all three links serving to restrain and control further movement of the outer wing portion as it passes inwardly over its vertical position. The bellcrank 38 in this modification provides a portion extending from pivot 39 to pivot 40 which may be aligned with the top chord of the spar for transmission of compression stresses during flight conditions and also serves to sustain in compression the weight of the outer wing portion during the retracting operation. The links 41, 43 and 44 in the modification shown in Fig. 4 serve a similar function to that performed by the bellcrank in Fig. 1 by initially exerting actuating forces against pivot 47 to push the outer portion upwardly and secondly by providing tension forces to restrain the continued counter-clockwise rotation of the wing section 14 about its pivot 40 beyond the vertical position. As in the case of the previously described modification, similar actuating, locking and stop means may be provided.

In the modification shown in Fig. 5, the outer wing portion 14 is pivoted or hinged to the fixed wing portion 13 at the pivot 48 and the operating cylinder and piston assembly 31—34 is pivotally connected at 49 to the common pivot of the links 50 and 51. The other terminal of the link 50 is pivoted to rotate about the hinge axis 48 while the remaining terminal of the link 51 is pivotally connected at 52 to the common pivots of further links 53 and 54, the former being pivotally connected to the fixed wing portion 13 at 55 and the latter being pivotally connected to the movable wing portion 14 at 56.

In the modification shown in Fig. 5 rotation and retraction of the outer wing portion 14 is similarly effected by outward extension of the piston 34 exerting a spreading force upon the toggle links 50 and 51. Pivot 48 being fixed, the pivots 49 and 52 swing downwardly and outwardly. Similarly, the link 53 rotating about its fixed pivot 55 imparts an upward and outward movement to the link 54 causing its pivot 55 and the movable wing portion 14 to rotate about the common hinge between the wing portions at 48. It will be noted that as the outer portion is continued in its retracting movement and moves past its vertical position the links 51 and 54 are adapted to restrain too rapid rotation of the outer wing panel by applying the tension forces developed by the hydraulic piston member 34. It will also be noted that the resultant of these tension forces is produced by a compressive force in the link 53 exerted at its inner and lower pivotal terminal to the fixed wing at 55.

It will be obvious to those skilled in the art that other modifications and arrangements of the respective parts can be produced to obtain the results herein described, but it is intended that they all fall within the scope and spirit of the present invention as set forth in the appended claims.

We claim:

1. In a folding wing for aircraft, a fixed wing portion, a movable wing portion supported entirely therefrom, bell crank means pivoted at spaced points to said fixed and movable portions, actuating means pivotally associated with said bell crank at a point remote from said spaced points, linkage means separately pivoted to each said wing portion adapted to arrest unrestrained rotation of said movable portion about its bell crank pivot upon actuated rotation of the said bell crank means, each said means being disposed entirely within the wing in its extended position.

2. In a folding wing for aircraft, an internally braced fixed inner wing portion, a movable outer wing portion, a link member interposed between and pivotally connected directly to each of said portions adjacent and substantially parallel to a surface of said wing, a stationary pivot carried by said inner portion spaced from said pivotal link connection, a movable pivot carried by said outer portion spaced from the second said pivotal link connection, a bell crank member pivotally engaging said movable pivot and adapted for pivotal rotation upon said fixed pivot, and actuating means associated with said bell crank member adapted by rotation thereof to rotate said outer wing portion to a folded position entirely above and adjacent said fixed portion.

3. In a folding wing for aircraft, an internally braced fixed wing portion, a movable wing portion, a member separately pivoted to each said portion, actuating means associated with said member adapted for the rotation of said movable portion therewith into a retracted position, and link means separately pivoted to each said portion disposed entirely within and spanwise of said wing adapted to limit rocking movement of said outer portion upon its pivot to said member.

4. In aircraft having internally braced folding wings, a fixed wing portion, and an apertured hinge fitting at an outer edge thereof, a movable wing portion, and an apertured hinge fitting at an inner edge thereof, alined apertures at the bottom chord portions of each fitting adapted to receive wing locking means, spaced apertures at the top chord portions of each fitting, a top chord link adapted to pivotally interconnect said spaced apertures at the top chord portions and operating means for folding said wing about said link comprising an actuating device and a member rotatable upon a pivot carried by said inner fitting and associated with a pivot carried by said outer fitting.

5. In aircraft having internally braced wings, a foldable wing member and operating means for swinging said member relative to a wing supporting member between extended and retracted positions, comprising a link pivotally connected to both said foldable and supporting members, a movable pivot means on said foldable member eccentric of said link pivot, a lever member having its outer end connected to said movable pivot means, said lever member being pivoted for rotation upon said supporting member, and actuating means associated with said lever member adapted to rotate said foldable wing member about the end of said supporting member to a substantially parallel position above and spaced therefrom by said link.

6. In a folding wing for aircraft, an internally braced fixed wing portion, a movable wing portion, a bell crank member separately pivoted to each said portion, said bell crank having a third remotely disposed pivotal connection, actuating means associated with said third pivotal connection adapted to rotate said movable portion by rotation of said bell crank, and link means, disposed within said wing, separately pivoted to each said wing portion adapted to cooperate during the folding operation by imparting secondary forward rotation of said movable portion with respect to said bell crank portion.

7. In a folding wing for aircraft, an internally braced fixed wing portion, a movable wing portion, a bell crank member separately pivoted to each said portion, said bell crank having a third remotely disposed pivotal connection, actuating means associated with said third pivotal connection adapted to rotate said movable portion by rotation of said bell crank, and link means separately pivoted to each said wing portion adapted to cooperate during the folding operation by imparting secondary forward rotation of said movable portion with respect to said bell crank portion, said link means being disposed adjacent and substantially parallel to the upper surface of said wing and additionally serving in the folded attitude to relatively space the said wing portions.

8. In aircraft having folding wings of the internally braced type, a fixed wing portion, a movable outer wing portion supported entirely therefrom, a lever member separately pivoted to each portion, actuating means associated with said lever member adapted to rotate the same and said outer portion in the same direction upwardly and inwardly above said fixed wing portion, and link means directly interconnecting pivotal connections on each said wing portion adapted to impart secondary relative rotation between said outer portion and said lever member upon rotation of the latter.

9. In aircraft having folding wings of the internally braced type, a fixed inner wing portion, a foldable outer wing portion, aligned wing spar portions having fittings attached to each spar portion, said spar portions having top and bottom chord elements, a link member having spanwise spaced parallel hinge pins outerconnecting the upper portions of said fittings in a structural continuation of the top chord of the said spar sections, and means to fold said outer wing portion both with respect to said link member and to said fixed inner wing portion.

10. In aircraft having folding wings of the internally braced type, a fixed inner wing portion, a foldable outer wing portion, aligned wing spar sections for the support of each said wing portion, said spar sections including fittings having spanwise spaced parallel apertures in the region of the upper chord of said spar sections, a link member having pin elements pivotally interconnecting said spaced apertures for the structural continuation of said spar top chord and the support of said outer wing portion, and actuating means adapted to rotate said outer wing portion about the axes of both of said spaced pin elements to a folded position in which the outer wing portion overlies the inner portion in a closely spaced relationship.

OSCAR A. SWANSON.
JAMES E. LIPP.
NEWTON H. ANDERSON.
FRANK N. FLEMING.